US012695092B2

(12) United States Patent
Nagamine et al.

(10) Patent No.: US 12,695,092 B2
(45) Date of Patent: Jul. 28, 2026

(54) POSITIVE ELECTRODE MATERIAL AND BATTERY

(71) Applicant: Panasonic Intellectual Property Management Co., Ltd., Osaka (JP)

(72) Inventors: Kenta Nagamine, Osaka (JP); Izuru Sasaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 643 days.

(21) Appl. No.: 18/046,504

(22) Filed: Oct. 14, 2022

(65) Prior Publication Data

US 2023/0074539 A1　Mar. 9, 2023

Related U.S. Application Data

(63) Continuation of application No. PCT/JP2021/016566, filed on Apr. 26, 2021.

(30) Foreign Application Priority Data

Apr. 28, 2020　(JP) ................................. 2020-079582

(51) Int. Cl.
| | |
|---|---|
| *H01M 4/62* | (2006.01) |
| *H01M 4/36* | (2006.01) |
| *H01M 4/505* | (2010.01) |
| *H01M 4/525* | (2010.01) |
| *H01M 10/0525* | (2010.01) |
| *H01M 10/0562* | (2010.01) |
| *H01M 4/02* | (2006.01) |

(52) U.S. Cl.
CPC ............. *H01M 4/62* (2013.01); *H01M 4/366* (2013.01); *H01M 4/505* (2013.01); *H01M 4/525* (2013.01);
(Continued)

(58) Field of Classification Search
CPC .......... H01M 4/62; H01M 4/36; H01M 4/366; H01M 4/505; H01M 4/525;
(Continued)

(56) References Cited

U.S. PATENT DOCUMENTS

| | | |
|---|---|---|
| 2009/0081554 A1 | 3/2009 | Takada et al. |
| 2017/0077502 A1 | 3/2017 | Kishimoto et al. |
| 2020/0350623 A1 | 11/2020 | Sasaki et al. |

FOREIGN PATENT DOCUMENTS

| | | |
|---|---|---|
| CN | 106068573 A | 11/2016 |
| JP | 2006-244734 | 9/2006 |

(Continued)

OTHER PUBLICATIONS

Machine translation of CN 106068573 A (Year: 2016).*

(Continued)

*Primary Examiner* — Kevin P Kerns
(74) *Attorney, Agent, or Firm* — WHDA, LLP

(57) ABSTRACT

Provided is a positive electrode material including a first solid electrolyte, a positive electrode active material, and a coating material at least partially coating a surface of the positive electrode active material. The first solid electrolyte is represented by the following compositional formula (1): $Li_aM_bX_c$. In the compositional formula (1), a, b, and c are positive real numbers and satisfy a mathematical expression: $a+b<c$; M is at least one selected from the group consisting of metallic elements excluding Li and metalloid elements; and X is at least one selected from the group consisting of F, Cl, Br, and I. The coating material includes an oxoacid salt of a non-metal or metalloid cation.

16 Claims, 4 Drawing Sheets

(52) U.S. Cl.
CPC ... *H01M 10/0525* (2013.01); *H01M 10/0562*
(2013.01); *H01M 2004/028* (2013.01); *H01M
2300/008* (2013.01)

(58) Field of Classification Search
CPC ......... H01M 10/0525; H01M 10/0562; H01M
2004/028; H01M 2300/008
USPC ................................................. 429/322, 323
See application file for complete search history.

(56) References Cited

FOREIGN PATENT DOCUMENTS

| | | | | |
|---|---|---|---|---|
| JP | 2015-165463 | 9/2015 | | |
| WO | 2007/004590 | 1/2007 | | |
| WO | WO 2012176604 A1 * | 12/2012 | .......... | H01M 50/269 |
| WO | 2019/146216 | 8/2019 | | |

OTHER PUBLICATIONS

Machine translation of WO 2012176604 A1 (Year: 2012).*
English Translation of Chinese Search Report dated Jan. 2, 2025 for
the related Chinese Patent Application No. 202180030510.1.
The EPC Office Action dated Sep. 21, 2023 for the related European
Patent Application No. 21797565.5.
Anonymous: "Transition metal—Wikipedia", Jan. 1, 2000 (Jan. 1,
2000), XP093032392, Retrieved from the Internet: URL:https://en.
wikipedia.org/wiki/Transition_metal [retrieved on Mar. 16, 2023].
International Search Report of PCT application No. PCT/JP2021/
016566 dated Jul. 13, 2021.

* cited by examiner

POSITIVE ELECTRODE MATERIAL AND BATTERY

BACKGROUND

1. Technical Field

The present disclosure relates to a positive electrode material and a battery.

2. Description of the Related Art

Japanese Unexamined Patent Application Publication No. 2006-244734 discloses a battery that uses a compound including indium as a cation and a halogen element as an anion, as a solid electrolyte.

International Publication No. 2007/004590 discloses an all solid lithium battery including a lithium ion conductive solid electrolyte mainly composed of a sulfide and an active material having a surface coated with a lithium ion conductive oxide.

SUMMARY

One non-limiting and exemplary embodiment provides a positive electrode material that can reduce the resistance of a battery.

In one general aspect, the techniques disclosed here feature a positive electrode material comprising a first solid electrolyte, a positive electrode active material, and a coating material at least partially coating a surface of the positive electrode active material, wherein the first solid electrolyte is represented by a compositional formula (1): $Li_aM_bX_c$, in the compositional formula (1), a, b, and c are positive real numbers and satisfy a mathematical expression: $a+b<c$; M is at least one selected from the group consisting of metallic elements excluding Li and metalloid elements; and X is at least one selected from the group consisting of F, Cl, Br, and I, and the coating material includes an oxoacid salt of a non-metal or metalloid cation.

The present disclosure provides a positive electrode material that can reduce the resistance of a battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
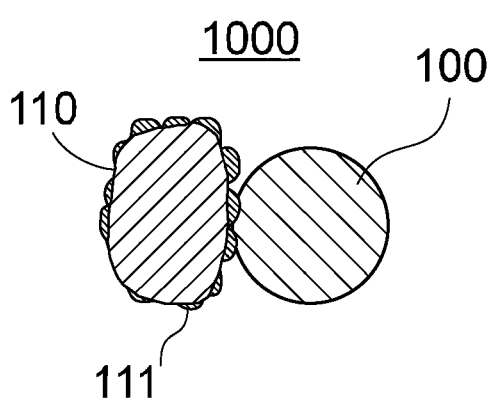
FIG. 1 is a cross-sectional view illustrating a schematic structure of a positive electrode material in Embodiment 1.

Underlying Knowledge Forming Basis of the Present Disclosure

Japanese Unexamined Patent Application Publication No. 2006-244734 discloses an all solid secondary battery including a solid electrolyte made of a compound including indium as a cation and a halogen element as an anion. The patent literature mentions that in this all solid secondary battery, the potential of the positive electrode active material is desirably 3.9 V or less in average with respect to Li, and, consequently, a film made of a decomposition product due to oxidative decomposition of the solid electrolyte is prevented from being formed to obtain good charge and discharge characteristics. In addition, as a positive electrode active material having a potential of 3.9 V or less in average with respect to Li, common layered transition metal oxide positive electrodes, such as $LiCoO_2$ and $LiNi_{0.8}Co_{0.15}Al_{0.05}O_2$, are disclosed. Incidentally, in the patent literature, the detailed mechanism of the oxidative decomposition has not been revealed.

The present inventors examined the resistance of halide solid electrolytes to oxidative decomposition. The present inventors have diligently studied and, as a result, have found that in a battery using a halide solid electrolyte as the solid electrolyte included in a positive electrode material, even when a positive electrode active material having a potential of 3.9 V or less in average with respect to Li is used, the halide solid electrolyte is oxidatively decomposed during charging. Furthermore, the present inventors also found that there is a disadvantage that the charge and discharge efficiency of the battery is decreased with the oxidative decomposition of the halide solid electrolyte, and the cause thereof is oxidation reaction of the halogen element included in the halide solid electrolyte.

Specifically, in addition to the normal charging reaction in which lithium and electrons are extracted from the positive electrode active material in a positive electrode material, a side reaction occurs in which electrons are also extracted from the halide solid electrolyte being in contact with the positive electrode active material, and this reaction (that is, oxidation reaction of the halide solid electrolyte) consumes the charge. The oxidation reaction of the halide solid electrolyte forms an oxidized layer poor in lithium ion conductivity between the positive electrode active material and the halide solid electrolyte. This oxidized layer is thought to function as large interface resistance in the electrode reaction of the positive electrode. In order to overcome this disadvantage, it is necessary to suppress the transfer of electrons to the halide solid electrolyte to suppress the formation of an oxidized layer.

International Publication No. 2007/004590 discloses an all solid lithium battery including a lithium ion conductive solid electrolyte mainly composed of a sulfide and an active material having a surface coated with a lithium ion conductive oxide. In particular, it is known that a use of lithium niobate (i.e., $LiNbO_3$) disclosed in the patent literature as a lithium ion conductive oxide reduces the interface resistance of electrode reaction and can significantly improve the output characteristics. For these reasons, in a battery including a lithium ion conductive solid electrolyte mainly composed of a sulfide, lithium niobate is often used as a coating material of positive electrode active material particles.

In contrast, the present inventors have diligently studied and, as a result, newly found that in a battery using a halide solid electrolyte as the solid electrolyte included in a positive electrode material, the resistance of a battery can be significantly reduced when the coating material includes an oxoacid salt such as lithium phosphate compared when the coating material includes lithium niobate. That is, it was found that the coating material that is significantly effective varies depending on the lithium ion conductive solid electrolyte used as the solid electrolyte of a battery, i.e., a sulfide or a halide. Although the principle thereof is not clear, it is inferred that various factors, such as the oxidation resistance of the coating material, the oxidation resistance of the lithium ion conductive solid electrolyte used as the solid electrolyte of the battery, the reactivity between the coating material and the active material, the reactivity between the coating material and the solid electrolyte, and the coverage rate of the coating material in the surface of the active material, are multiply involved. The present inventors further found that among these factors, in particular, the coverage rate is highly related in a reduction in the resistance of a battery.

The present inventors integrated the above findings and arrived at the following positive electrode materials of the present disclosure that can reduce the resistance of a battery.

Outline of an Aspect According to the Present Disclosure

A positive electrode material according to a 1st aspect of the present disclosure includes:

a first solid electrolyte;

a positive electrode active material; and a coating material at least partially coating a surface of the positive electrode active material, wherein the first solid electrolyte is represented by the compositional formula (1):

$$Li_a M_b X_c \qquad \text{Formula (1)},$$

in the compositional formula (1), a, b, and c are positive real numbers and satisfy a mathematical expression: $a+b<c$, M is at least one selected from the group consisting of metallic elements excluding Li and metalloid elements, and X is at least one selected from the group consisting of F, Cl, Br, and I, and the coating material includes an oxoacid salt of a non-metal or metalloid cation.

In the positive electrode material according to the 1st aspect, the coating material lies between the positive electrode active material and the first solid electrolyte of a halide solid electrolyte. This coating material suppresses the transfer of electrons to the halide solid electrolyte. Consequently, since a side reaction of the halide solid electrolyte is suppressed, formation of an oxidized layer is suppressed, resulting in a reduction in the interface resistance of an electrode reaction.

In the positive electrode material according to the 1st aspect, the coating material further includes an oxide material, specifically, an oxoacid salt of a non-metal or metalloid cation. Furthermore, consequently, the resistance of a battery can be more effectively reduced.

For the above reasons, the positive electrode material according to the 1st aspect can reduce the resistance of a battery. Furthermore, consequently, the positive electrode material according to the 1st aspect can improve the charge and discharge efficiency of a battery.

In a 2nd aspect of the present disclosure, for example, in the positive electrode material according to the 1st aspect, the surface of the positive electrode active material may be partially exposed.

The positive electrode material according to the 2nd aspect is a positive electrode material including a halide solid electrolyte, and the coating material coating the positive electrode active material includes the oxide material in the 1st aspect and does not completely coat the entire surface of the positive electrode active material. That is, the surface of the positive electrode active material is partially exposed. As described above, if the positive electrode active material and the solid electrolyte are in direct contact with each other, electrons are extracted from the solid electrolyte when the potential of the positive electrode rises when charging the battery to form an oxidized layer. In order to prevent it, interposition of a layer formed of a coating material is effective. However, the layer formed of a coating material also blocks, for example, electronic contact between an active material and a conductive assistant and electronic contact between active material particles. Accordingly, if the surface of the positive electrode active material is completely coated with a coating material, the electronic path from the current collector of a battery to each active material particle is discontinued, and the isolated active material particles do not contribute to the charging and discharging reaction in some cases. In such a case, the apparent amount of the active material in the electrode decreases, and the reaction area decreases, resulting in an increase in the resistance. The positive electrode material according to the 2nd aspect can suppress the side reaction and secure the electron path by exposing a part of the surface instead of coating the entire surface of the active material with a coating material.

In a 3rd aspect of the present disclosure, for example, in the positive electrode material according to the 1st or 2nd aspect, the coverage rate, which is the proportion of the coated surface area of the positive electrode active material coated with the coating material to the whole surface area of the positive electrode active material, may be 10% or more and may be 90% or less.

The positive electrode material according to the 3rd aspect can more effectively reduce the resistance of a battery.

In a 4th aspect of the present disclosure, for example, in the positive electrode material according to any one of the 1st to 3rd aspects, the oxide material may include at least one selected from the group consisting of B, Si, P, Ge, and Te.

The positive electrode material according to the 4th aspect can more effectively reduce the resistance of a battery.

In a 5th aspect of the present disclosure, for example, in the positive electrode material according to any one of the 1st to 4th aspects, the oxide material may include at least one selected from the group consisting of P, Si, and B.

The positive electrode material according to the 5th aspect can more effectively reduce the resistance of a battery.

In a 6th aspect of the present disclosure, for example, in the positive electrode material according to any one of the 1st to 5th aspects, the oxide material may include Li.

The positive electrode material according to the 6th aspect can increase the carrier concentration at the interface between the positive electrode active material and the first solid electrolyte. Accordingly, the positive electrode material according to the 6th aspect can more effectively reduce the resistance of a battery.

In a 7th aspect of the present disclosure, for example, in the positive electrode material according to any one of the 1st to 6th aspect, the oxide material may include at least one selected from the group consisting of lithium phosphate, lithium silicate, lithium borate, and lithium silicophosphate.

The positive electrode material according to the 7th aspect can enhance the lithium ion conductivity in the coating material. Specifically, it is inferred that since the coating material is partially amorphized by including a lithium compound of an oxide called glass-forming oxide such as phosphoric acid or silicic acid to broaden the ion conductive path, the lithium ion conductivity can be enhanced. Consequently, the positive electrode material according to the 7th aspect can more effectively reduce the resistance of a battery.

In an 8th aspect of the present disclosure, for example, in the positive electrode material according to any one of the 1st to 7th aspects, the mass proportion of the oxide material to the positive electrode active material may be 0.1 mass % or more and may be 2.3 mass % or less.

When the mass proportion of the oxide material to the positive electrode active material is 0.1 mass % or more, the side reaction of the positive electrode active material and the first solid electrolyte can be effectively suppressed. Accordingly, the positive electrode material according to the 8th aspect can more effectively reduce the resistance of a battery. In addition, when the mass proportion of the oxide material to the positive electrode active material is 2.3 mass % or less, the proportions of the positive electrode active material and the first solid electrolyte in the positive electrode can be increased. Accordingly, the positive electrode material according to the 8th aspect can increase the energy density of a battery.

In a 9th aspect of the present disclosure, for example, in the positive electrode material according to any one of the 1st to 8th aspects, the mass proportion of the oxide material to the positive electrode active material may be 0.1 mass % or more and may be 2.0 mass % or less.

When the mass proportion of the oxide material to the positive electrode active material is 0.1 mass % or more, the side reaction of the positive electrode active material and the first solid electrolyte can be effectively suppressed. Accordingly, the positive electrode material according to the 9th aspect can more effectively reduce the resistance of a battery. In addition, when the mass proportion of the oxide material to the positive electrode active material is 2.0 mass % or less, the proportions of the positive electrode active material and the first solid electrolyte in the positive electrode can be increased. Accordingly, the positive electrode material according to the 9th aspect can increase the energy density of a battery.

In a 10th aspect of the present disclosure, for example, in the positive electrode material according to any one the 1st to 9th aspects, the mass proportion of the oxide material to the positive electrode active material may be 0.25 mass % or more and may be 1.14 mass % or less.

When the mass proportion of the oxide material to the positive electrode active material is 0.25 mass % or more, the side reaction of the positive electrode active material and the first solid electrolyte can be effectively suppressed. Accordingly, the positive electrode material according to the 10th aspect can more effectively reduce the resistance of a battery. In addition, when the mass proportion of the oxide material to the positive electrode active material is 1.14 mass % or less, the proportions of the positive electrode active material and the first solid electrolyte in the positive electrode can be increased. Accordingly, the positive electrode material according to the 10th aspect can increase the energy density of a battery.

In an 11th aspect of the present disclosure, for example, in the positive electrode material according to any one of the 1st to 10th aspects, the M may include Y (i.e., yttrium).

The positive electrode material according to the 11th aspect can further improve the ion conductivity of the first solid electrolyte. Consequently, the positive electrode material according to the 11th aspect can further improve the charge and discharge efficiency of a battery.

In a 12th aspect of the present disclosure, for example, in the positive electrode material according to any one of the 1st to 11th aspects, the X may include at least one selected from the group consisting of F, Cl, and Br.

The positive electrode material according to the 12th aspect can further improve the ion conductivity of the first solid electrolyte. Consequently, the positive electrode material according to the 12th aspect can further improve the charge and discharge efficiency of a battery.

In a 13th aspect of the present disclosure, for example, in the positive electrode material according to any one of the 1st to 12th aspects, the X may include at least two selected from the group consisting of F, Cl, and Br.

The positive electrode material according to the 13th aspect can further improve the ion conductivity of the first solid electrolyte. Consequently, the positive electrode material according to the 13th aspect can further improve the charge and discharge efficiency of a battery.

In a 14th aspect of the present disclosure, for example, in the positive electrode material according to any one of the 1st to 13th aspects, the X may include Cl and Br.

The positive electrode material according to the 14th aspect can further improve the ion conductivity of the first solid electrolyte. Consequently, the positive electrode material according to the 14th aspect can further improve the charge and discharge efficiency of a battery.

In a 15th aspect of the present disclosure, for example, in the positive electrode material according to any one of the 1st to 14th aspects, the positive electrode active material may include a lithium-containing transition metal oxide.

The positive electrode material according to the 15th aspect can increase the energy density of a battery.

The battery according to a 16th aspect of the present disclosure includes:

a positive electrode including the positive electrode material according to any one of the 1st to 15th aspects;

a negative electrode; and an electrolyte layer disposed between the positive electrode and the negative electrode.

The battery according to the 16th aspect can improve the charge and discharge efficiency.

In a 17th aspect of the present disclosure, for example, in the battery according to the 16th aspect, the electrolyte layer may include a sulfide solid electrolyte.

The battery according to the 17th aspect can improve the charge and discharge efficiency.

Embodiments of the present disclosure will now be described with reference to the drawings.

Embodiment 1

FIG. 1 is a cross-sectional view illustrating a schematic structure of a positive electrode material 1000 in Embodiment 1. The positive electrode material 1000 in Embodiment 1 includes a first solid electrolyte 100, a positive electrode active material 110, and a coating material 111 coating a surface of the positive electrode active material 110. As shown in FIG. 1, the first solid electrolyte 100 and the positive electrode active material 110 may be in the form of particles. A part of the surface of the positive electrode active material 110 is not coated with the coating material 111 and is exposed. That is, the positive electrode active material 110 and the first solid electrolyte 100 are isolated from each other by the coating material 111, and there are a portion where they are in contact with each other and a portion where they are not in contact with each other. The coating material 111 includes an oxide material.

The first solid electrolyte 100 is represented by the following compositional formula (1):

$$Li_aM_bX_c \hspace{3cm} \text{Formula (1).}$$

In the compositional formula (1), a, b, and c are positive real numbers and satisfy a mathematical expression: $a+b<c$. M is at least one selected from the group consisting of metallic elements excluding Li and metalloid elements. X is at least one selected from the group consisting of F, Cl, Br, and I.

Incidentally, regarding M in the compositional formula (1) of the first solid electrolyte 100, the "metalloid element" is B, Si, Ge, As, Sb, or Te. The "metallic element" is any of all elements in Groups 1 to 12 of the Periodic Table excluding hydrogen or any of all elements in Groups 13 to 16 excluding B, Si, Ge, As, Sb, Te, C, N, P, O, S, and Se. That is, they are an element group that can become cations when form inorganic compounds with halogen compounds.

In the positive electrode material 1000 in the present Embodiment, the coating material 111 lies between the positive electrode active material 110 and the first solid electrolyte 100 of a halide solid electrolyte. This coating material 111 suppresses the transfer of electrons to the halide solid electrolyte. Consequently, since a side reaction of the halide solid electrolyte is suppressed, formation of an oxidized layer is suppressed, resulting in a reduction in the interface resistance of an electrode reaction. In addition, the positive electrode material 1000 in this embodiment includes a halide solid electrolyte, and the coating material 111 coating the positive electrode active material 110 includes an oxide material and does not completely coat the entire surface of the positive electrode active material 110. That is, a part of the surface of the positive electrode active material 110 is exposed. Accordingly, the positive electrode material 1000 of the present embodiment can both suppress the side reaction in the positive electrode during charging and secure the electron path. From these reasons, the positive electrode material 1000 in the present embodiment can reduce the resistance of a battery. Furthermore, consequently, the charge and discharge efficiency of the battery can be improved.

In order to more effectively reduce the resistance of a battery by further suppressing the side reaction of the battery, the coverage rate, which is the proportion of the coated surface area of the positive electrode active material coated with the coating material 111 to the whole surface area of the positive electrode active material 110, may be 10% or more and 90% or less. In order to more effectively reduce the resistance of a battery, the coverage rate may be 18% or more and may be 87% or less. In order to more effectively reduce the resistance of a battery, the coverage rate may be 30% or more and 70% or less or 40% or more and 60% or less.

The coverage rate can be determined by separating peaks of O1s in X-ray photoelectron spectroscopy (XPS). For example, when $Li(Ni,Co,Mn)O_2$ is used as the positive electrode active material 110 and lithium phosphate is used as the coating material 111, the coverage rate may be determined by dividing the area of O1s peak derived from the positive electrode active material having the peak top at around 529 eV by the area obtained by subtracting the O1s peak derived from carbonic acid appearing at around 531 eV from the O1s peak appearing at around 532 eV.

If it is difficult to correctly determine the coverage rate by the above method, as an alternative method, the coverage rate may be determined from the ratio of the content of metal elements, such as Ni, Co, and Mn, in the active material 110 and the content of cations, such as P or Si, in the coating material 111 measured by XPS.

The oxide material included in the coating material 111 may include an oxoacid salt. The coating material 111 including an oxoacid salt can more effectively reduce the resistance of a battery. The oxoacid salt may be an oxoacid salt of a non-metal or metalloid cation. The "metalloid element" is B, Si, Ge, As, Sb, or Te as described above. The "non-metal element" is N, P, S, Cl, Br, or I. That is, these elements are an element group that bind to oxygen to generate oxo acid.

The oxide material included in the coating material 111 may include at least one selected from the group consisting of B, Si, P, Ge, and Te. According to this composition, since the coating material 111 with low electron conductivity can be formed on the surface of the active material 110, the side reaction of a battery can be further reduced. The elements such as B, Si, P, Ge, and Te form strong covalent bonds with oxygen. Accordingly, the electrons in the material forming the coating material 111 are delocalized to reduce the electron conductivity. Accordingly, even when the thickness of the coating layer formed of the coating material 111 is thin, transfer of electrons between the active material 110 and the first solid electrolyte 100 can be blocked to more effectively suppress the side reaction.

In addition, the oxide material included in the coating material 111 may include at least one selected from the group consisting of P, Si, and B. According to this composition, since the coating material 111 having lower electron conductivity can be formed on the surface of the active material 110, the side reaction of a battery can be further reduced. The elements such as P, Si, and B form stronger covalent bonds with oxygen. Accordingly, the electrons in the material forming the coating material 111 are delocalized to reduce the electron conductivity. Accordingly, even when the thickness of the coating layer formed of the coating material 111 is thin, transfer of electrons between the active material 110 and the first solid electrolyte 100 can be blocked to more effectively suppress the side reaction.

The oxide material included in the coating material 111 may include Li. According to this composition, since the carrier concentration at the interface between the positive electrode active material 110 and the first solid electrolyte 100 can be increased, the resistance of a battery can be more effectively reduced.

The coating material 111 may include at least one selected from the group consisting of lithium phosphate, lithium silicate, lithium borate, and lithium silicophosphate. According to this composition, the lithium ion conductivity in the coating material 111 can be enhanced. Consequently, the resistance of a battery can be more effectively reduced.

It is inferred that when the coating material 111 includes a lithium compound of an oxide called glass-forming oxide such as phosphoric acid, silicic acid, or boric acid, the coating material 111 is partially amorphized to broaden the ion conductive path, and the lithium ion conductivity can be enhanced. Consequently, the positive electrode material 1000 can more effectively reduce the resistance of a battery.

The mass proportion of the oxide material included in the coating material 111 to the positive electrode active material 110 may be 2.0 mass % or less or 1.14 mass % or less. According to this composition, since the proportion of the active material 110 or the first solid electrolyte 100 in the positive electrode can be increased, the energy density of a battery can be increased.

The mass proportion of the oxide material included in the coating material 111 to the positive electrode active material 110 may be 0.1 mass % or more or 0.25 mass % or more. According to this composition, since the side reaction of the active material 110 and the first solid electrolyte 100 can be effectively suppressed, the resistance of a battery can be more effectively reduced.

The mass proportion of the oxide material included in the coating material 111 to the positive electrode active material 110 may be determined by, for example, dissolving the positive electrode with an acid or the like to form an aqueous solution and then quantitatively measuring the included elements by inductively coupled plasma (ICP) emission spectrochemical analysis. On this occasion, the mass proportion may be determined from the quantitative values of elements that are included in either one of the active material 110 and the coating material 111 by presuming a stoichiometric composition. For example, when $LiNiO_2$ is coated with $Li_3PO_4$, the mass proportion of the coating material may be determined from the quantitative values of Ni and P by assuming that $LiNiO_2$ and $Li_3PO_4$ are present in the stoichiometric compositions.

In the compositional formula (1), M may include Y (=yttrium). That is, the first solid electrolyte 100 may include Y as the metallic element. According to this composition, the ion conductivity of the first solid electrolyte 100 can be further improved. Consequently, the charge and discharge efficiency of a battery can be further improved.

In the compositional formula (1), $2.5 \leq a \leq 3$, $1 \leq b \leq 1.1$, and $5.4 \leq c \leq 6.6$ may be satisfied.

According to the composition above, the ion conductivity of the first solid electrolyte 100 can be further improved. Consequently, the charge and discharge efficiency of a battery can be further improved.

Incidentally, in the compositional formula (1), X may include at least one element selected from the group consisting of F, Cl, and Br. According to this composition, the ion conductivity of the first solid electrolyte 100 can be further improved. Consequently, the charge and discharge efficiency of a battery can be further improved.

Incidentally, X (=anion) included in the first solid electrolyte 100 may further include oxygen in addition to at least one element selected from the group consisting of F, Cl, Br, and I. According to this composition, the ion conductivity of the first solid electrolyte 100 can be further improved. Consequently, the charge and discharge efficiency of a battery can be further improved.

X in the compositional formula (1) may include Cl and Br. According to this composition, the ion conductivity of the first solid electrolyte 100 can be further improved. Consequently, the charge and discharge efficiency of a battery can be further improved.

Incidentally, the positive electrode active material 110 may be a lithium-containing transition metal oxide. According to this composition, the energy density of a battery can be increased.

As the first solid electrolyte 100, for example, $Li_3YX_6$, $Li_2MgX_4$, $Li_2FeX_4$, $Li(Al, Ga, In)X_4$, or $Li_3(Al, Ga, In)X_6$ can be used.

The positive electrode active material 110 is, for example, a material that has a property of occluding and releasing metal ions (e.g., lithium ions). Examples of the positive electrode active material include a lithium-containing transition metal oxide, a transition metal fluoride, a polyanion material, a fluorinated polyanion material, a transition metal sulfide, a transition metal oxysulfide, and a transition metal oxynitride. Examples of the lithium-containing transition metal oxide include $Li(Ni, Co, Al)O_2$, $Li(Ni,Co,Mn)O_2$, and $LiCoO_2$. For example, when a lithium-containing transition metal oxide is used as the positive electrode active material, the manufacturing cost of the positive electrode can be reduced, and the average discharge voltage can be increased.

In order to increase the energy density of a battery, the positive electrode active material 110 may be lithium nickel-cobalt manganate. For example, the positive electrode active material 110 may be $Li(Ni,Co,Mn)O_2$.

According to the composition above, the energy density and charge and discharge efficiency of a battery can be further enhanced.

Incidentally, the coating material 111 may include lithium phosphate or lithium silicate as a main component and may further include inevitable impurities or the starting material that is used when the coating material is formed, a by-product, a decomposition product, etc. That is, the coating material 111 may include lithium phosphate and lithium silicate such that the total mass proportion with respect to the whole coating material 111 is, for example, 50% or more (50 mass % or more). The coating material 111 may include lithium phosphate and lithium silicate such that the total mass proportion with respect to the whole coating material 111 excluding impurities inevitably mixed is, for example, 100% (100 mass %).

The thickness of the coating material 111 may be 1 nm or more and 100 nm or less.

The coating material 111 having a thickness of 1 nm or more can prevent the direct contact between the positive electrode active material 110 and the first solid electrolyte 100 and can suppress the side reaction of the first solid electrolyte. Accordingly, the charge and discharge efficiency can be improved.

When the thickness of the coating material 111 is 100 nm or less, the thickness of the coating material 111 does not become too thick. Accordingly, the internal resistance of a battery can be sufficiently reduced. As a result, the energy density of the battery can be increased.

The thickness of the coating material 111 may be 2 nm or more and 40 nm or less.

The coating material 111 having a thickness of 2 nm or more can further prevent the direct contact between the positive electrode active material 110 and the first solid electrolyte 100 and can suppress the side reaction of the first solid electrolyte 100. Accordingly, the charge and discharge efficiency can be further improved.

In addition, when the thickness of the coating material 111 is 40 nm or less, the internal resistance of a battery can be further reduced. As a result, the energy density of the battery can be increased.

The method for measuring the thickness of the coating material 111 is not particularly limited. For example, the thickness can be determined by directly observing the thickness of the coating material 111 using a transmission electron microscope or the like. The thickness can also be determined from a change in the spectrum derived from the active material measured by XPS while removing the coating layer by Ar sputtering.

The shape of the first solid electrolyte 100 in Embodiment 1 is not particularly limited and may be, for example, needle-like, spherical, or elliptical spherical. For example, the first solid electrolyte 100 may be in a particle shape.

For example, when the shape of the first solid electrolyte 100 in Embodiment 1 is in the form of particles (e.g., spherical), the median diameter may be 100 µm or less. When the median diameter is larger than 100 µm, there is a risk that the positive electrode active material 110 and the first solid electrolyte 100 cannot form a good dispersion state in the positive electrode material 1000. Accordingly, the charge and discharge characteristics are decreased. In Embodiment 1, the median diameter may be 10 µm or less.

According to the configuration above, the positive electrode active material 110 and the first solid electrolyte 100 can form a good dispersion state in the positive electrode material 1000.

In addition, in Embodiment 1, the first solid electrolyte 100 may be smaller than the median diameter of the positive electrode active material 110.

According to the configuration above, the first solid electrolyte 100 and the positive electrode active material 110 can form a better dispersion state in an electrode.

The median diameter of the positive electrode active material 110 may be 0.1 µm or more and 100 µm or less.

When the median diameter of the positive electrode active material 110 is smaller than 0.1 µm, there is a risk that the positive electrode active material 110 and the first solid electrolyte 100 cannot form a good dispersion state in the positive electrode material 1000. Resultantly, the charge and discharge characteristics of a battery are decreased. When the median diameter of the positive electrode active material 110 is larger than 100 µm, the lithium diffusion in the positive electrode active material 110 slows down. Consequently, it may be difficult to operate the battery at high output.

The median diameter of the positive electrode active material 110 may be larger than that of the first solid electrolyte 100. Consequently, the positive electrode active material 110 and the first solid electrolyte 100 can form a good dispersion state.

Incidentally, in the positive electrode material 1000 in Embodiment 1, the first solid electrolyte 100 and the coating material 111 may be in contact with each other as shown in FIG. 1.

The positive electrode material 1000 in Embodiment 1 may include a plurality of first solid electrolytes 100 in the form of particles and a plurality of positive electrode active materials 110 in the form of particles.

In the positive electrode material 1000 in Embodiment 1, the content of the first solid electrolyte 100 and the content of the positive electrode active material 110 may be the same as or different from each other.

Method for Manufacturing First Solid Electrolyte

The first solid electrolyte in Embodiment 1 can be manufactured by, for example, the following method.

Raw material powders of binary halides are prepared so as to give the blending ratio of a desired composition. For example, in the case of producing Li₃YBr₃Cl₃, LiBr and YCl₃ are prepared at a molar ratio of 3:1.

On this occasion, "M" and "X" in the above-mentioned compositional formula can be determined by selecting the types of the raw material powders. The values "a", "b", and "c" can be adjusted by adjusting the raw materials, blending ratio, and synthesis process.

The raw material powders are well mixed and are then mixed, pulverized, and reacted with each other by a mechanochemical method. Alternatively, the raw material powders are well mixed and then may be sintered in vacuum.

Method for Manufacturing Positive Electrode Active Material Coated with Coating Material The positive electrode active material 110 coated with the coating material 111 can be manufactured by the following method.

First, a powder for the positive electrode active material 110 is prepared. The powder for the positive electrode active material 110 is produced by, for example, a coprecipitation method. In the coprecipitation method, a precursor made of a metal oxide is produced, and the precursor is heat-treated together with a lithium source to produce the positive electrode active material 110. There are commercial products of powders for the positive electrode active material 110 of various compositions, and they are readily available.

Subsequently, a coating material 111 is formed on the surfaces of particles of the positive electrode active material 110. The method for forming the coating material 111 is not particularly limited. Examples of the method for forming the coating material 111 include a liquid phase coating method and a gas phase coating method.

For example, in the liquid phase coating method, a precursor solution of the coating material 111 is applied to the surface of the positive electrode active material 110. When a coating material 111 including lithium phosphate is formed, the precursor solution can be a mixed solution of a solvent, lithium hydroxide, and triethyl phosphate.

Incidentally, the raw material is not limited as long as it is dissolved or dispersed in a solvent. Examples of the lithium source include alkyl lithium, such as tert-butyl lithium; lithium alkoxides, such as lithium methoxide, lithium ethoxide, lithium isopropoxide, and lithium tert-butoxide; and lithium iodide, lithium bromide, lithium chloride, lithium carbonate, lithium nitrate, lithium sulfate, and metallic lithium. Examples of the phosphoric acid source include trimethyl phosphate, tripropyl phosphate, tributyl phosphate, phosphoric acid, ammonium dihydrogen phosphate, diammonium hydrogen phosphate, and triammonium phosphate. A raw material including phosphoric acid and lithium may be used.

The solvent is, for example, alcohol such as ethanol. However, the solvent is not limited as long as it can dissolve or disperse the raw material, and various solvents can be selected depending on the raw material. Examples of the solvent include methanol, propanol, isopropanol, butanol, dimethyl carbonate, diethyl carbonate, ethyl methyl carbonate, dimethyl sulfoxide, tetrahydrofuran, hexane, benzene, toluene, methylene chloride, acetone, and acetonitrile.

The amounts of lithium hydroxide and triethyl phosphate are adjusted according to the target composition of the coating material 111. According to the need, water may be added to a precursor solution. The precursor solution may be acidic or alkaline.

Embodiment 2

Embodiment 2 will now be described. The description overlapping with that of Embodiment 1 will be appropriately omitted.

Figure 2:
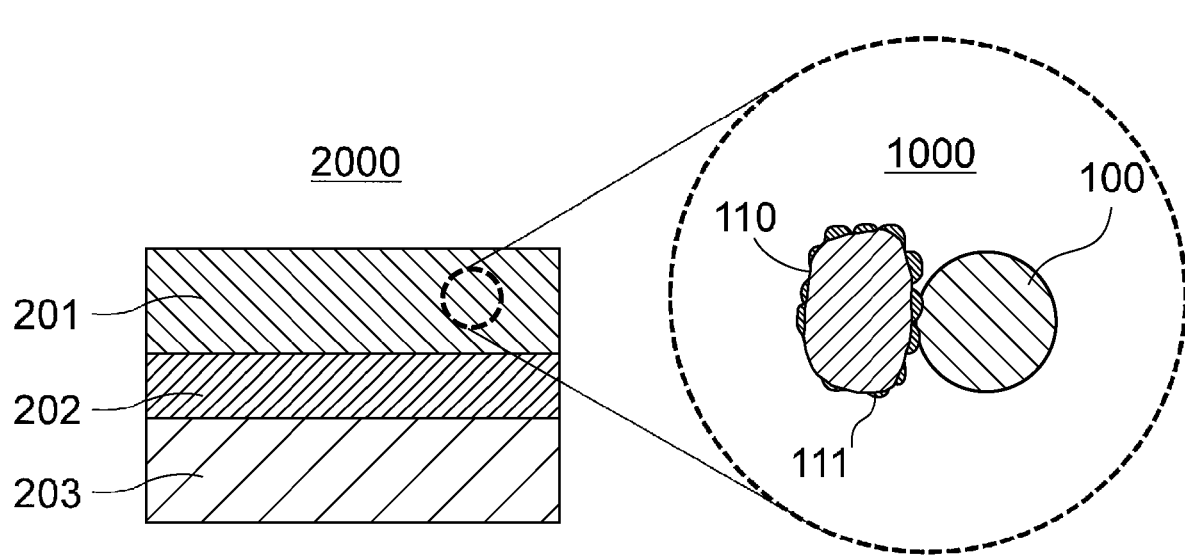
FIG. 2 is a cross-sectional view illustrating a schematic structure of a battery in Embodiment 2.

FIG. 2 is a cross-sectional view illustrating a schematic structure of a battery 2000 in Embodiment 2.

The battery 2000 in Embodiment 2 includes a positive electrode 201, an electrolyte layer 202, and a negative electrode 203.

The positive electrode 201 includes the positive electrode material 1000 in Embodiment 1.

The electrolyte layer 202 is disposed between the positive electrode 201 and the negative electrode 203.

According to the configuration above, the charge and discharge efficiency of the battery 2000 can be improved.

The volume ratio of the positive electrode active material 110 and the first solid electrolyte 100 included in the positive electrode 201, "v1:100-v1", may satisfy 30≤v1≤95. Here, v1 represents the volume ratio of the positive electrode active material 110 when the total volume of the positive electrode active material 110 and the first solid electrolyte 100 included in the positive electrode 201 is defined as 100. When 30≤v1 is satisfied, a sufficient energy density of the battery 2000 is likely to be secured. When v1≤95 is satisfied, the operation of the battery 2000 at high output is more easy.

The thickness of the positive electrode 201 may be 10 μm or more and 500 μm or less. Incidentally, when the thickness of the positive electrode 201 is 10 μm or more, a sufficient energy density of the battery 2000 can be secured. Incidentally, when the thickness of the positive electrode 201 is 500 μm or less, it is possible to achieve high-output operation of the battery 2000.

The electrolyte layer 202 is disposed between the positive electrode 201 and the negative electrode 203.

The electrolyte layer 202 is a layer including an electrolyte material. The electrolyte material is, for example, a solid electrolyte (i.e., a second solid electrolyte). That is, the electrolyte layer 202 may be a solid electrolyte layer.

As the second solid electrolyte included in the electrolyte layer 202, the first solid electrolyte described in Embodiment 1 above is mentioned. That is, the electrolyte layer 202 may include the first solid electrolyte described in Embodiment 1 above.

According to the composition above, the charge and discharge efficiency of the battery 2000 can be further improved.

The second solid electrolyte included in the electrolyte layer 202 may be a halide solid electrolyte that is different form the first solid electrolyte described in Embodiment 1 above. That is, the electrolyte layer 202 may include a halide solid electrolyte that is different form the first solid electrolyte described in Embodiment 1 above.

According to the composition above, the output density and charge and discharge efficiency of the battery 2000 can be improved.

The halide solid electrolyte included in the electrolyte layer 202 may include Y as a metallic element.

According to the composition above, the output density and charge and discharge efficiency of the battery 2000 can be further improved.

As the second solid electrolyte included in the electrolyte layer 202, a sulfide solid electrolyte may be used. That is, the electrolyte layer 202 may include a sulfide solid electrolyte.

According to the composition above, since a sulfide solid electrolyte having excellent reduction stability is included, a low-potential negative electrode material, such as graphite or metallic lithium, can be used, and the energy density of the battery 2000 can be improved.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. In addition, for example, $LiX2$ (X2: F, Cl, Br, or I), $Li_2O$, $M2O_q$, or $Li_pM2O_q$ (M2: any of P, Si, Ge, B, Al, Ga, In, Fe, and Zn) (p, q: natural number) may be added to these sulfide solid electrolytes.

As the second solid electrolyte included in the electrolyte layer 202, an oxide solid electrolyte, a polymer solid electrolyte, or a complex hydride solid electrolyte may be used.

As the oxide solid electrolyte, for example, a NASICON-type solid electrolyte represented by $LiTi_2(PO_4)_3$ and its element substitution products, a $(LaLi)TiO_3$-based perovskite-type solid electrolyte, an LISICON-type solid electrolyte represented by $Li_{14}ZnGe_4O_{16}$, $Li_4SiO_4$, $LiGeO_4$ and their element substitution products, a garnet-type solid electrolyte represented by $Li_7La_3Zr_2O_{12}$ and its element substitution products, $Li_3N$ and its H substitution products, $Li_3PO_4$ and its N substitution products, or glass or glass-ceramic in which $Li_2SO_4$, $Li_2CO_3$, or the like is added to the base material of an Li—B—O compound, such as $LiBO_2$ or $Li_3BO_3$, can be used.

As the polymer solid electrolyte, for example, a compound of a polymer compound and a lithium salt can be used. The polymer compound may have an ethylene dioxide structure. The polymer compound having an ethylene dioxide structure can contain a large amount of a lithium salt and can further enhance the ion conductivity. As the lithium salt, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these lithium salts can be used alone. Alternatively, as the lithium salt, a mixture of two or more lithium salts selected from these lithium salts can be used.

As the complex hydride solid electrolyte, for example, $LiBH_4$—$LiI$ or $LiBH_4$—$P_2S_5$ can be used.

Incidentally, the electrolyte layer 202 may include the second solid electrolyte as a main component. That is, the electrolyte layer 202 may include the second solid electrolyte at a mass proportion of, for example, 50% or more (50 mass % or more) with respect to the whole electrolyte layer 202.

According to the composition above, the charge and discharge characteristics of the battery 2000 can be further improved.

The electrolyte layer 202 may include the second solid electrolyte at a mass proportion of, for example, 70% or more (70 mass % or more) with respect to the whole electrolyte layer 202.

According to the composition above, the charge and discharge characteristics of the battery 2000 can be further improved.

Incidentally, the electrolyte layer 202 may include the second solid electrolyte as a main component and may further include inevitable impurities or the starting material that is used when the second solid electrolyte is synthesized, a by-product, a decomposition product, etc.

The electrolyte layer 202 may include the second solid electrolyte, for example, at a mass proportion of 100% (100 mass %) with respect to the whole electrolyte layer 202 excluding impurities inevitably mixed.

According to the composition above, the charge and discharge characteristics of the battery 2000 can be further improved.

As described above, the electrolyte layer 202 may be composed of the second solid electrolyte only.

Incidentally, the electrolyte layer 202 may include two or more materials mentioned as the second solid electrolyte. For example, the solid electrolyte layer may include a halide solid electrolyte and a sulfide solid electrolyte.

The thickness of the electrolyte layer 202 may be 1 μm or more and may be 300 μm or less. When the thickness of the electrolyte layer 202 is 1 μm or more, the positive electrode 201 and the negative electrode 203 are unlikely to short circuit. When the thickness of the electrolyte layer 202 is 300 μm or less, high-output operation is easy. That is, the battery 2000 can secure sufficient safety and can be operated at high output by appropriately adjusting the thickness of the electrolyte layer 202.

The negative electrode 203 includes a material that has a property of occluding and releasing metal ions (e.g., lithium ions). The negative electrode 203 includes, for example, a negative electrode active material.

As the negative electrode active material, for example, a metal material, a carbon material, an oxide, a nitride, a tin compound, or a silicon compound can be used. The metal material may be a single metal. Alternatively, the metal material may be an alloy. Examples of the metal material include lithium metals and lithium alloys. Examples of the carbon material include natural graphite, coke, carbon under graphitization, carbon fibers, spherical carbon, artificial graphite, and amorphous carbon. From the viewpoint of capacity density, silicon (Si), tin (Sn), a silicon compound, or a tin compound can be suitably used.

The negative electrode 203 may include a third solid electrolyte. According to the composition above, the lithium ion conductivity in the negative electrode can be enhanced, and operation at high output is possible. As the third solid electrolyte included in the negative electrode 203, the materials mentioned as the examples of the second solid electrolyte of the electrolyte layer 202 can be used.

The median diameter of the negative electrode active material particles may be 0.1 µm or more and may be 100 µm or less. When the median diameter of the negative electrode active material particles is smaller than 0.1 µm, there is a risk that the negative electrode active material particles and the third solid electrolyte cannot form a good dispersion state in the negative electrode 203. Consequently, the charge and discharge characteristics of the battery 2000 are decreased. When the median diameter of the negative electrode active material particles is larger than 100 µm, the lithium diffusion in the negative electrode active material particles slows down. Consequently, it may be difficult to operate the battery at high output.

The median diameter of the negative electrode active material particles may be larger than that of the third solid electrolyte. Consequently, the negative electrode active material particles and the solid electrolyte can form a good dispersion state.

The volume ratio of the negative electrode active material particles and the solid electrolyte included in the negative electrode 203, "v2:100-v2", may satisfy $30 \leq v2 \leq 95$. When $30 \leq v2$ is satisfied, a sufficient energy density of the battery 2000 is likely to be secured. When $v2 \leq 95$ is satisfied, the operation of the battery 2000 at high output is more easy.

The thickness of the negative electrode 203 may be 10 µm or more and may be 500 µm or less. When the thickness of the negative electrode 203 is 10 µm or more, a sufficient energy density of the battery 2000 is easily secured. When the thickness of the negative electrode 203 is 500 µm or less, the operation of the battery 2000 at high output is more easy.

At least one selected from the group consisting of the positive electrode 201, the electrolyte layer 202, and the negative electrode 203 may include a binder for the purpose of improving the adhesion between particles. The binder is used for improving the adhesion of the material constituting the electrode. Examples of the binder include polyvinylidene fluoride, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene-butadiene-rubber, and carboxymethylcellulose. In addition, as the binder, a copolymer of two or more materials selected from tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene can be used. Moreover, a mixture of two or more materials selected from these materials may be used as the binder.

At least one of the positive electrode 201 and the negative electrode 203 may include a conductive assistant for the purpose of enhancing the electron conductivity. As the conductive assistant, for example, graphite such as natural graphite or artificial graphite, carbon black such as acetylene black or Ketjen black, a conductive fiber such as a carbon fiber or a metal fiber, a metal powder such as fluorinated carbon or aluminum, a conductive whisker such as zinc oxide or potassium titanate, a conductive metal oxide such as titanium oxide, or a conductive polymer compound such as polyaniline, polypyrrole, or polythiophene can be used. In the case of using a carbon conductive assistant, it is possible to reduce the cost.

Incidentally, the battery 2000 in Embodiment 2 can be configured as batteries of various shapes, such as a coin type, a cylindrical type, a square type, a sheet type, a button type, a flat type, and a laminated type.

Examples of the shape of the battery 2000 in Embodiment 2 include a coin type, a cylindrical type, a square type, a sheet type, a button type, a flat type, and a laminated type.

The battery 2000 in Embodiment 2 may be manufactured by, for example, preparing the positive electrode material 1000 in Embodiment 1, an electrolyte layer-forming material, and a negative electrode-forming material and producing a stack of a positive electrode, an electrolyte layer, and a negative electrode disposed in this order by a known method.

EXAMPLES

The present disclosure will now be described in more detail with reference to Examples and Comparative Examples.

Comparative Example 1

Production of Positive Electrode Active Material Having Surface Coated with Coating Material Lithium hydroxide (9.5 mg) and triethyl phosphate (24.0 mg) were dissolved in an appropriate amount of super-dehydrated ethanol (manufactured by FUJIFILM Wako Pure Chemical Corporation) in an argon glove box under an argon atmosphere of a dew point of −60° C. or less (hereinafter, referred to as "in an argon atmosphere") to produce a coating material solution. In the coating material solution, the molar ratio of lithium and phosphorus was 3:1.

As a positive electrode active material, 2 g of $Li(Ni,Co,Mn)O_2$ (hereinafter, referred to as NCM) was prepared in an agate mortar, and the coating material solution produced above was then gradually added thereto with stirring.

After the coating material solution was completely added, stirring was continued until dryness could be visually observed.

The powder after the dryness was put in an alumina crucible and heat-treated in an oxygen atmosphere at 400° C. for 3 hours.

The powder obtained after the heat treatment was pulverized in an agate mortar again to obtain a positive electrode active material of Comparative Example 1 having a surface coated with a coating material. The coating material was lithium phosphate.

Production of Sulfide Solid Electrolyte $Li_2S$ and $P_2S_5$ were weighed at a molar ratio, $Li_2S:P_2S_5$, of 75:25 in an argon atmosphere and were pulverized and mixed in a mortar. Subsequently, milling treatment using a planetary ball mill (manufactured by Fritsch, P-7 type) was performed at 510 rpm for 10 hours to obtain a glass-like solid electrolyte. The glass-like solid electrolyte was heat-treated at 270° C. for 2 hours in an inert atmosphere. Consequently, a glass-ceramic-like solid electrolyte, $Li_2S$—$P_2S_5$, was obtained.

Production of Battery

The positive electrode active material having a surface coated with lithium phosphate as the coating material and $Li_2S$—$P_2S_5$ as the sulfide solid electrolyte were prepared at a mass ratio of 85:15 in an argon atmosphere. They were mixed in an agate mortar to produce a positive electrode composite material.

A sulfide solid electrolyte $Li_6PS_5Cl$ (80 mg), an LYBC powder (20 mg), and the above positive electrode composite material (19.5 mg) were stacked in this order in an insulating outer cylinder. A pressure of 720 MPa was applied thereto to obtain a positive electrode and an electrolyte layer.

Subsequently, Li foil was laminated to the electrolyte layer on the opposite side to the side in contact with the positive electrode. A pressure of 80 MPa was applied thereto to produce a stack of the positive electrode, the electrolyte layer, and a negative electrode. The negative electrode was made of the Li foil.

Subsequently, current collectors made of stainless steel were disposed on and under the laminate, and the current collectors were provided with current collector leads. Ultimately, the inside of the insulating outer cylinder was isolated and sealed from the outside atmosphere using an insulating ferrule.

As in above, a battery of Comparative Example 1 was produced.

Charge and Discharge Test

The battery of Comparative Example 1 was disposed in a thermostatic tank of 25° C. The battery was charged at a constant current value of 0.140 mA, and the charging was stopped at a voltage of 4.3 V. Subsequently, discharging was performed at the same current value of 0.140 mA and was ended at a voltage of 2.5 V.

Resistance Measurement

Figure 3:
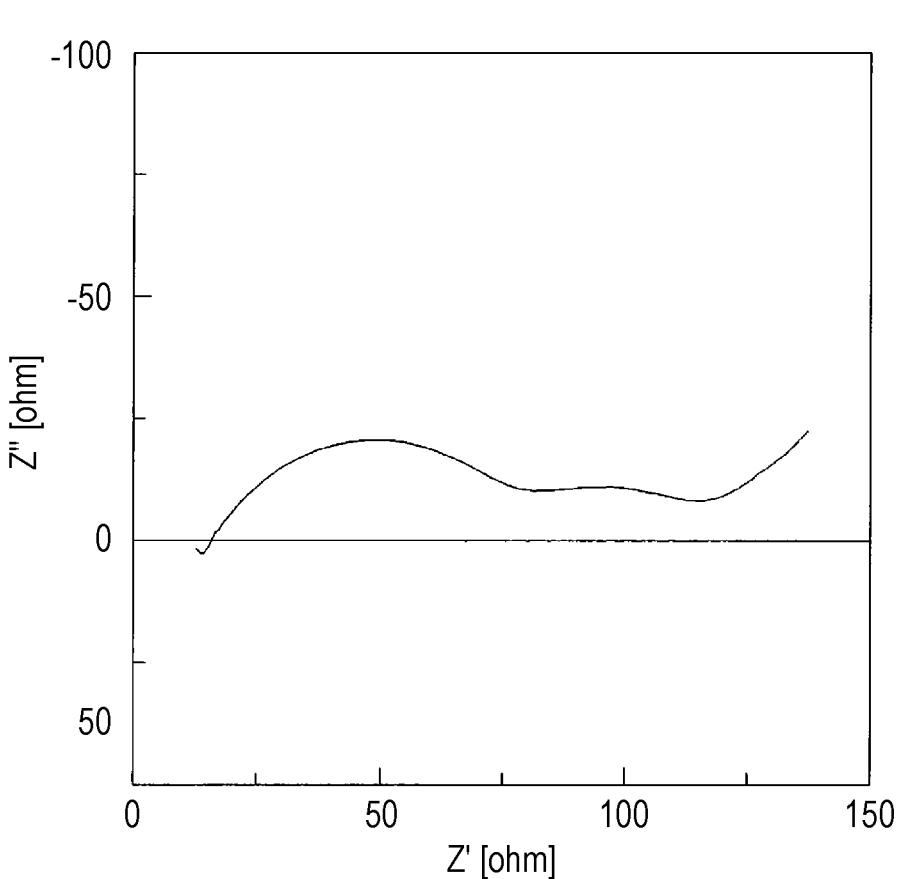
FIG. 3 is a graph showing a Nyquist diagram of a battery in Comparative Example 1 at 3.7 V.

FIG. 3 is a graph showing a Nyquist diagram of a battery in Comparative Example 1 at 3.7 V. The battery of Comparative Example 1 is disposed in a thermostatic tank of 25° C. and was then connected to a potentiostat loaded with a frequency response analyzer. Subsequently, the battery was charged at a constant current value of 0.140 mA, and the charging was stopped at a voltage of 3.7 V. Subsequently, the frequency dependence of resistance components was evaluated by an alternating current impedance method. On this occasion, the resistance component appearing at around $10^5$ to $10^2$ Hz was isolated by curve fitting as resistance derived from the active material-solid electrolyte interface. The resistance of the battery of Comparative Example 1 was estimated to be 53 ohm by this measurement.

Rate of Change of Resistance

A battery was produced by the same method as that for the battery of Comparative Example 1 except that the positive electrode active material used in Comparative Example 1 was used without coating the surface with the coating material. This battery was used as a standard battery. The resistance of the standard battery was measured by the same method as that for the resistance of the battery of Comparative Example 1. The resistance of the standard battery was estimated to be 2300 ohm. The rate of change of resistance of the battery of Comparative Example 1 is the value obtained by dividing the resistance of the battery of Comparative Example 1 by the resistance of the standard battery, multiplying the result by 100, and subtracting 100 from the resulting value. That is, it is the value showing how much the resistance of the battery has changed by coating the positive electrode active material with a coating material.

Measurement of Coverage Rate

Figure 4A:
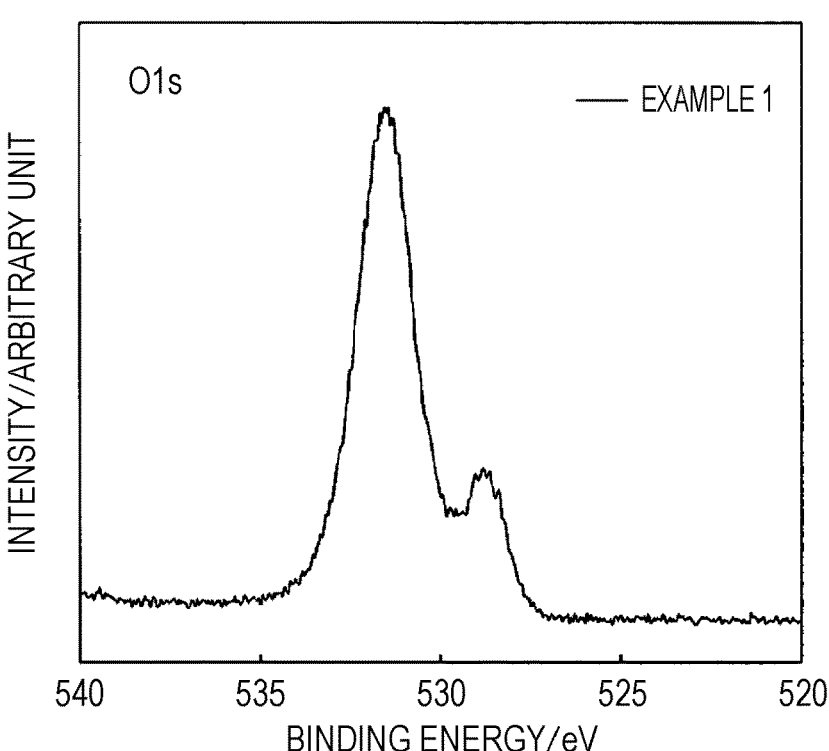
FIG. 4A is a graph showing an O1s spectrum of an active material used in Comparative Example 1 measured by X-ray photoelectron spectroscopy.

FIG. 4A is a graph showing an O1s spectrum of an active material used in Comparative Example 1 measured by an XPS method. An O1s spectrum of the positive electrode active material surface coated with lithium phosphate was obtained by the XPS method. As the ray source of the XPS, A1-Kα-rays were used. Incidentally, in Example 1 described later, the same active material as that used in Comparative Example 1 was used. That is, the O1s spectrum of the active material by the XPS method shown in FIG. 4A is also a graph showing the O1s spectrum by the XPS method of the active material used in Example 1. Accordingly, it is shown in FIG. 4A that the O1s spectrum is a spectrum of the active material used in Example 1.

Figure 4B:
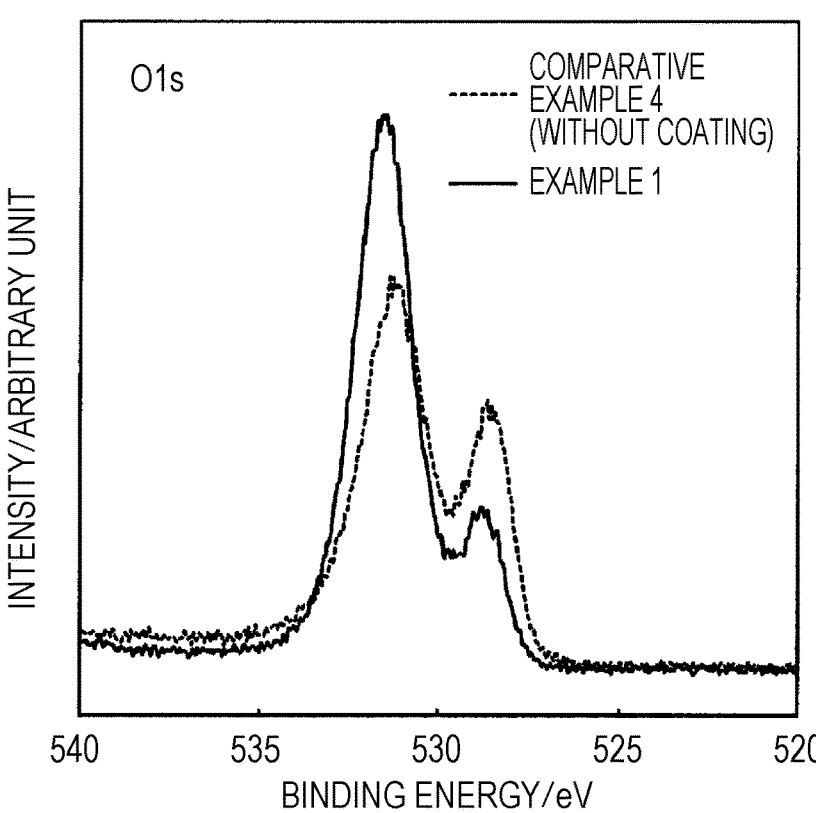
FIG. 4B is a graph showing an O1s spectrum of an active material used in Comparative Example 1 measured by X-ray photoelectron spectroscopy and an O1s spectrum of an active material having a surface not coated with a coating material measured by X-ray photoelectron spectroscopy.

A peak with the center at 528 eV and a peak with the center at 532 eV were observed. The peak at 528 eV is a peak derived from M—O(Ni—O, Mn—O, Co—O) in the positive electrode active material. The peak at 532 eV is a peak created by overlapping of the peak of C—O in lithium carbonate, which is an impurity of the surface, and the peak of P—O in lithium phosphate. The influence derived from lithium carbonate was removed by subtracting the peak area at around 532 eV detected for an active material not coated with a coating material and heat-treated in an oxygen atmosphere at 400° C. from the peak area at around 532 eV of the coated active material, and the peak area derived from the coating material was calculated. FIG. 4B is a graph showing an O1s spectrum by the XPS method of the active material used in Comparative Example 1 and an O1s spectrum by the XPS method of the active material having a surface not coated with a coating material. Incidentally, in Comparative Example 4 described later, the positive electrode active material NCM used in Comparative Example 1 of which the surface was not coated with a coating material was used. That is, the O1s spectrum by the XPS method of the active material having a surface not coated with a coating material shown in FIG. 4B is also a graph showing the spectrum of the O1s spectrum by the XPS method of the active material used in Comparative Example 4. Accordingly, in FIG. 4B, it is shown that the two O1s spectra are spectra of the active materials used in Example 1 and Comparative Example 4, respectively.

The ratio of M—O and P—O in O1s was determined from these peaks to estimate the coverage rate. The coverage rate of lithium phosphate of the active material used in Comparative Example 1 was estimated to be 47%.

Comparative Example 2

Production of Positive Electrode Active Material Having Surface Coated with Coating Material Ethoxylithium (manufactured by Kojundo Chemical Lab. Co., Ltd., 5.95 g) and pentaethoxyniobium (manufactured by Kojundo Chemical Lab. Co., Ltd., 36.43 g) were dissolved in super-dehydrated ethanol (manufactured by FUJI-FILM Wako Pure Chemical Corporation, 500 mL) in an argon atmosphere to produce a coating material solution.

In formation of a coating material on the positive electrode active material NCM, a rolling fluidized granulation coating apparatus (manufactured Powrex Corporation, FD-MP-01E) was used. The input of the positive electrode active material, the stirring rotation number, and the solution sending rate of the coating material solution were 1 kg, 400 rpm, and 6.59 g/min, respectively.

The powder after treatment was put in an alumina crucible and taken out under the atmosphere.

Subsequently, heat treatment was performed in the atmosphere at 300° C. for 1 hour.

The powder after the heat treatment was pulverized in an agate mortar again to obtain a positive electrode active material of Comparative Example 2 having a surface coated with a coating material. The coating material was lithium niobate ($LiNbO_3$).

Production of Battery

A battery was produced by the same method as in Comparative Example 1 except that the positive electrode active material of Comparative Example 2 was used.

Charge and Discharge Test

The charge and discharge test of the battery was performed by the same method as in Comparative Example 1.

Resistance Measurement

The resistance of the battery was measured by the same method as in Comparative Example 1.

Rate of Change of Resistance

The standard battery used in Comparative Example 1 was used as the standard battery, and the rate of change of resistance of Comparative Example 2 was determined by the same method as in Comparative Example 1.

Measurement of Coverage Rate

The O1s peak of Nb—O derived from lithium niobate appears at around 530 eV. The coverage rate was determined from the value as in Comparative Example 1. The coverage rate of the active material used in Comparative Example 2 was about 100%.

Consideration 1

Table 1 shows the coverage rates of the active materials used in Comparative Examples 1 and 2 and the rates of change of resistance when a sulfide solid electrolyte was used as the first solid electrolyte.

Comparison of the rates of change of resistance of Comparative Example 1 and Comparative Example 2 revealed that in Comparative Example 2, the rate of change of resistance is large in the negative direction, and a reduction in the resistance is larger. It is known that if an active material and a sulfide solid electrolyte are in direct contact with each other, a layer with high resistance is formed on the surface. Accordingly, it is inferred that this result is caused by that lithium niobate showing a high coverage rate prevent the active material and the sulfide solid electrolyte from being in contact with each other to suppress the generation of a resistance layer. It is realized that when a sulfide is used as the solid electrolyte, coating with lithium niobate showing a high coverage rate is more effective.

TABLE 1

| | Coating material | First solid electrolyte | Coverage rate | Rate of change of resistance |
|---|---|---|---|---|
| Comparative Example 1 | Lithium phosphate | Sulfide solid electrolyte ($Li_2S$-$P_2S_5$) | 47% | −97.7% |
| Comparative Example 2 | Lithium niobate | Sulfide solid electrolyte ($Li_2S$-$P_2S_5$) | 100% | −99.3% |

Example 1

Production of Halide Solid Electrolyte

LiCl, $YCl_3$, and $YBr_3$ were prepared as raw material powders at a molar ratio, LiCl:$YCl_3$:$YBr_3$, of 3.000:0.333:0.666 in an argon atmosphere. They were pulverized and mixed in a mortar. Subsequently, the resulting mixture of the raw material powders was heat-treated in an argon atmosphere using an electric furnace at 500° C. for 3 hours. The resulting material was pulverized using a pestle and a mortar. As in above, a powder of a first solid electrolyte was obtained. Hereinafter, this powder is referred to as LYBC.

Production of Positive Electrode Active Material Having Surface Coated with Coating Material A positive electrode active material having a surface coated with lithium phosphate as a coating material was produced by the same method as in Comparative Example 1.

Production of Battery

The positive electrode active material having a surface coated with lithium phosphate, LYBC as a first solid electrolyte, and a vapor-grown carbon fiber (VGCF, manufactured by Showa Denko K.K.) as a conductive assistant were prepared at a mass ratio, positive electrode active material: LYBC:VGCF, of 80:18:2 in an argon atmosphere. They were mixed in an agate mortar to produce a positive electrode composite material. After this, a battery of Example 1 was produced as in Comparative Example 1.

Charge and Discharge Test

The charge and discharge test of the battery was performed by the same method as in Comparative Example 1.

Resistance Measurement

The resistance of the battery was measured by the same method as in Comparative Example 1.

Rate of Change of Resistance

A battery was produced by the same method as that for the battery of Comparative Example 1 except that the positive electrode active material used in Comparative Example 1 was used without coating the surface with the coating material. This battery was used as a standard battery. The resistance of the standard battery was measured by the same method as that for the resistance of the battery of Comparative Example 1. The resistance of the standard battery was estimated to be 73 ohm. The rate of change of resistance of the battery of Example 1 is the value obtained by dividing the resistance of the battery of Example 1 by the resistance of the standard battery, multiplying the result by 100, and subtracting 100 from the resulting value. That is, it is the value showing how much the resistance of the battery has changed by coating the positive electrode active material with a coating material.

Measurement of Coverage Rate

The coverage rate of Example 1 was determined as in Comparative Example 1. The coverage rate of the active material used in Example 1 was estimated to be 47%.

Comparative Example 3

Production of Positive Electrode Active Material Having Surface Coated with Coating Material A positive electrode active material having a surface coated with lithium phosphate as a coating material was produced by the same method as in Comparative Example 2.

Production of Secondary Battery

An active material coated with lithium niobate, LYBC as a first solid electrolyte, and a vapor-grown carbon fiber (VGCF, manufactured by Showa Denko K.K.) as a conductive assistant were prepared at a mass ratio, positive electrode active material:LYBC:VGCF, of 80:18:2 in an argon atmosphere. They were mixed in an agate mortar to produce a positive electrode composite material. After this, the battery of Comparative Example 3 was produced as in Comparative Example 1.

Measurement of Coverage Rate

The coverage rate of Comparative Example 3 was determined as in Comparative Example 2. The coverage rate of the active material used in Comparative Example 3 was estimated to be about 100%.

Consideration 2

Table 2 shows the coverage rates of the active materials used in Example 1 and Comparative Example 3 and rates of change of resistance when a halide solid electrolyte was used as the first solid electrolyte.

Comparison of the rates of change of resistance of Example 1 and Comparative Example 3 revealed that the rate of change of resistance in Example 1 is large in the negative direction, and the resistance can be more reduced than Comparative Example 3. If a halide solid electrolyte is in direct contact with an active material, the halogen element in the electrolyte is oxidized. It is therefore effective to prevent the direct contact between them by coating the active material in order to suppress the increase in battery resistance, as in the use of a sulfide solid electrolyte. However, when a halide solid electrolyte is used as the first solid electrolyte, since the contact between active materials and the contact between an active material and a conductive assistant are also lost by using lithium niobate showing a high coverage rate, the electron conductivity in the positive electrode composite material becomes insufficient. In contrast, in Example 1 using lithium phosphate, it is inferred that only the crystal face which has high reactivity with an active material is coated to suppress the reaction, and at the same time, since the active material is partially exposed, electronic connection can also be secured. Thus, it was confirmed by comparison between Example 1 and Comparative Example 3 that in the case of using halide solid electrolyte, it is desirable that a part of the active material is exposed.

TABLE 2

|  | Coating material | First solid electrolyte | Coverage rate | Rate of change of resistance |
|---|---|---|---|---|
| Example 1 | Lithium phosphate | Halide solid electrolyte (LYBC) | 47% | −61.2% |
| Comparative Example 3 | Lithium niobate | Halide solid electrolyte (LYBC) | 100% | −52.1% |

Comparative Example 4

Production of Battery

A positive electrode active material, NCM, not coated with a coating material, LYBC as a first solid electrolyte, and a vapor-grown carbon fiber (VGCF, manufactured by Showa Denko K.K.) as a conductive assistant were prepared at a mass ratio, NCM:LYBC:VGCF, of 80:18:2 in an argon atmosphere. They were mixed in an agate mortar to produce a positive electrode composite material. A battery was produced by the same method as in Comparative Example 1 except that this positive electrode composite material was used. The resulting battery was evaluated for the resistance as in Comparative Example 1.

Example 2

Production of Positive Electrode Active Material Having Surface Coated with Coating Material Lithium hydroxide (3.2 mg) and triethyl phosphate (8.0 mg) were dissolved in an appropriate amount of super-dehydrated ethanol (manufactured by FUJIFILM Wako Pure Chemical Corporation) in an argon glove box to produce a coating material solution. A positive electrode active material having a surface coated with a coating material was produced by the same method as in Example 1 except the above.

Production of Battery

A battery was produced by the same method as in Example 1 except that a positive electrode composite material was produced using the positive electrode active material having a surface coated with a coating material of Example 2. The resulting battery was evaluated for the resistance as in Comparative Example 1.

Measurement of Coverage Rate

The coverage rate of Example 2 was determined as in Comparative Example 1.

Example 3

Production of Positive Electrode Active Material Having Surface Coated with Coating Material Lithium hydroxide (6.3 mg) and triethyl phosphate (16.0 mg) were dissolved in an appropriate amount of super-dehydrated ethanol (manufactured by FUJIFILM Wako Pure Chemical Corporation) in an argon atmosphere to produce a coating material solution. A positive electrode active material having a surface coated with a coating material was produced by the same method as in Example 1 except the above.

Production of Battery

A battery was produced by the same method as in Example 1 except that a positive electrode composite material was produced using the positive electrode active material having a surface coated with a coating material of Example 3. The resulting battery was evaluated for the resistance as in Comparative Example 1.

Measurement of Coverage Rate

The coverage rate of Example 3 was determined as in Comparative Example 1.

Example 4

Production of Positive Electrode Active Material Having Surface Coated with Coating Material Lithium hydroxide (14.2 mg) and triethyl phosphate (36.0 mg) were dissolved in an appropriate amount of super-dehydrated ethanol (manufactured by FUJIFILM Wako Pure Chemical Corporation) in an argon atmosphere to produce a coating material solution. A positive electrode active material having a surface coated with a coating material was produced by the same method as in Example 1 except the above.

Production of Battery

A battery was produced by the same method as in Example 1 except that a positive electrode composite material was produced using the positive electrode active material having a surface coated with a coating material of Example 4. The resulting battery was evaluated for the resistance as in Comparative Example 1.

Measurement of Coverage Rate

The coverage rate of Example 4 was determined as in Comparative Example 1.

Example 5

Production of Positive Electrode Active Material Having Surface Coated with Coating Material Lithium hydroxide (10.5 mg), triethyl phosphate (11.4 mg), and tetraethyl orthosilicate (13.1 mg) were dissolved in an appropriate amount of super-dehydrated ethanol (manufactured by FUJIFILM Wako Pure Chemical Corporation) in an argon atmosphere to produce a coating material solution. A positive electrode active material having a surface coated with a coating material was produced by the same method as in Example 1 except the above.

Production of Battery

A battery was produced by the same method as in Example 1 except that a positive electrode composite material was produced using the positive electrode active material having a surface coated with a coating material of Example 5. The resulting battery was evaluated for the resistance as in Comparative Example 1.

Measurement of Coverage Rate

The coverage rate of Example 5 was determined as in Comparative Example 1.

Example 6

Production of Positive Electrode Active Material Having Surface Coated with Coating Material Lithium hydroxide (11.5 mg) and tetraethyl orthosilicate (25.0 mg) were dissolved in an appropriate amount of super-dehydrated ethanol (manufactured by FUJIFILM Wako Pure Chemical Corporation) in an argon atmosphere to produce a coating material solution. A positive electrode active material having a surface coated with a coating material was produced by the same method as in Example 1 except the above.

Production of Battery

A battery was produced by the same method as in Example 1 except that a positive electrode composite material was produced using the positive electrode active material having a surface coated with a coating material of Example 6. The resulting battery was evaluated for the resistance as in Comparative Example 1.

Measurement of Coverage Rate

The coverage rate of Example 6 was determined as in Comparative Example 1.

Consideration 3

Figure 5:
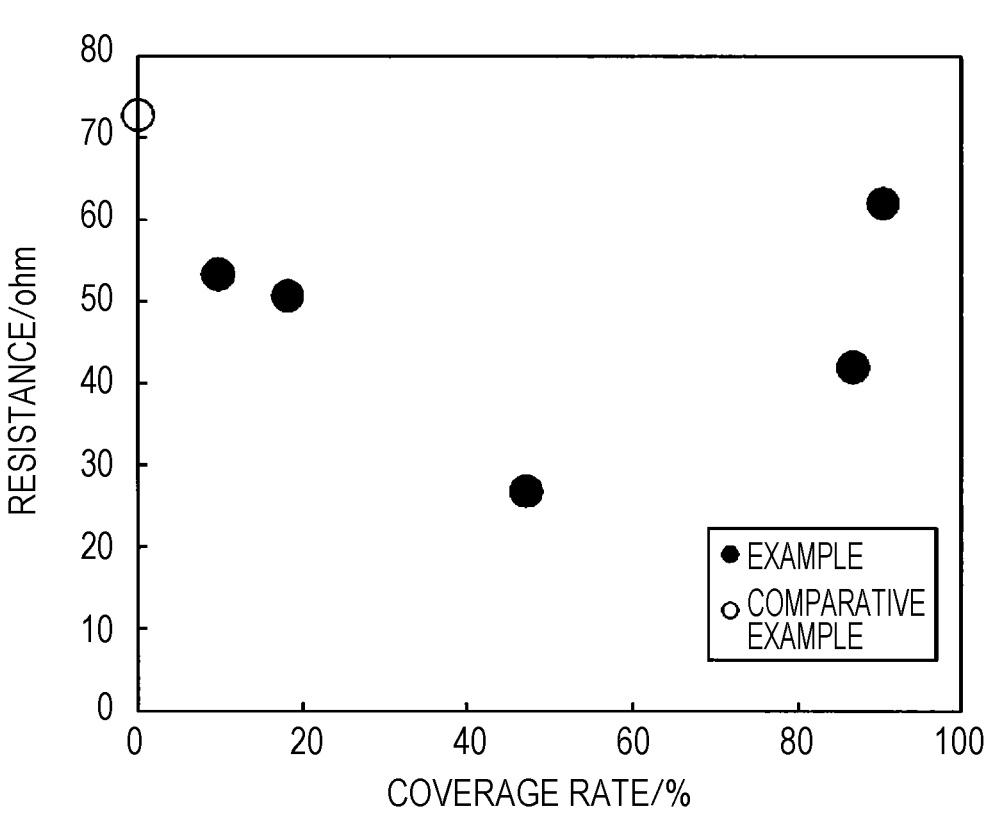
FIG. 5 is a graph showing a correlation between the coverage rate and resistance of the active materials of Comparative Example 4 and Examples 1 to 3, 5, and 6.

Table 3 shows the coating materials, estimated thicknesses, coating amounts, coverage rates, and resistances at 3.7 V in Comparative Example 4 and Examples 1 to 6. FIG. 5 is a graph showing a correlation between the coverage rate and resistance of the active materials of Comparative Example 4 and Examples 1 to 3, 5, and 6.

The estimated thickness was calculated from the BET ratio surface area of the active material and the density of the coating material by assuming that the whole area of the surface that can be measured as the BET ratio surface area was coated. Here, the BET ratio surface area of the active material was $0.5 \ m^2g^{-1}$, the density of lithium phosphate was $2.54 \ gcm^{-3}$, the density of lithium silicophosphate was $2.47 \ gcm^{-3}$, and the density of lithium silicate was $2.39 \ gcm^{-3}$.

The coating amount is the mass proportion of the oxide material as the coating material to the positive electrode active material. The mass proportion of the coating to the amount of the active material was calculated by assuming that the target coating material, e.g., lithium phosphate, remained when all volatile components, such as water and carbon dioxide, had volatilized from the added coating material. The estimated reaction formula is shown by the following Formula (3):

$$3LiOH+(C_2H_5)_3PO_4+15/2O_2 \rightarrow Li_3PO_4+9H_2O\uparrow+6CO_2\uparrow \qquad \text{Formula (3).}$$

Comparison between the resistance of Comparative Example 4 and the resistances of Examples 1 to 6 revealed that the resistance of a battery can be reduced by coating the surface of the positive electrode active material with lithium phosphate, lithium silicophosphate, or lithium silicate.

As shown in FIG. 5, the relationship between the coverage rate and the resistance shows that the resistance was reduced with an increase in the coverage rate over the coverage rate from 10% to 47%. On the other hand, over the coverage rate from 47% to 90%, the resistance was also increased with an increase in the coverage rate. This demonstrates that when the proportion of the exposing active material is within a certain range, the effect of reducing the resistance is more remarkable. It was revealed that in the present invention, the resistance of a battery can be significantly reduced within a coverage rate range from 10% to 90% compared to the case of not coating.

TABLE 3

| | Coating material | Estimated thickness of coating material [nm] | Coating amount [mass %] | Coverage rate [%] | Resistance [ohm] |
|---|---|---|---|---|---|
| Comparative Example 4 | None | 0 | 0.00 | 0 | 73 |
| Example 2 | Lithium phosphate | 2 | 0.25 | 10 | 53 |
| Example 3 | Lithium phosphate | 4 | 0.76 | 18 | 51 |
| Example 1 | Lithium phosphate | 6 | 0.51 | 47 | 27 |
| Example 4 | Lithium phosphate | 9 | 1.14 | — | 24 |

TABLE 3-continued

| | Coating material | Estimated thickness of coating material [nm] | Coating amount [mass %] | Coverage rate [%] | Resistance [ohm] |
|---|---|---|---|---|---|
| Example 5 | Lithium silicophosphate | 6 | 0.74 | 87 | 42 |
| Example 6 | Lithium silicate | 6 | 0.72 | 90 | 62 |

The battery of the present disclosure can be used, for example, as an all solid lithium secondary battery.

What is claimed is:

1. A positive electrode material comprising:

a first solid electrolyte;

a positive electrode active material; and a coating material at least partially coating a surface of the positive electrode active material, wherein the first solid electrolyte is represented by a following compositional formula (1):

$$Li_a M_b X_c \qquad \text{Formula (1),}$$

in the compositional formula (1):

a, b, and c are positive real numbers and satisfy a mathematical expression: $a+b<c$;

M is at least one selected from the group consisting of metallic elements excluding Li and metalloid elements; and X is at least one selected from the group consisting of F, Cl, Br, and I, the coating material includes an oxoacid salt of a non-metal or metalloid cation, the oxoacid salt includes lithium silicophosphate, and a coverage rate as a proportion of a coated surface area of the positive electrode active material coated with the coating material to a whole surface area of the positive electrode active material is 10% or more and is 90% or less.

2. The positive electrode material according to claim 1, wherein the surface of the positive electrode active material is partially covered by the coating material.

3. The positive electrode material according to claim 1, wherein a mass proportion of the oxoacid salt to the positive electrode active material is 0.1 mass % or more and is 2.3 mass % or less.

4. The positive electrode material according to claim 3, wherein the mass proportion of the oxoacid salt to the positive electrode active material is 0.1 mass % or more and is 2.0 mass % or less.

5. The positive electrode material according to claim 1, wherein a mass proportion of the oxoacid salt to the positive electrode active material is 0.25 mass % or more and is 1.14 mass % or less.

6. The positive electrode material according to claim 1, wherein the M includes Y.

7. The positive electrode material according to claim 1, wherein the X includes at least one selected from the group consisting of F, Cl, and Br.

8. The positive electrode material according to claim 1, wherein the X includes at least two selected from the group consisting of F, Cl, and Br.

9. The positive electrode material according to claim 1, wherein the X includes Cl and Br.

10. The positive electrode material according to claim 1, wherein the positive electrode active material includes a lithium-containing transition metal oxide.

11. The positive electrode material according to claim 1, wherein the X includes at least one selected from the group consisting of F and I.

12. The positive electrode material according to claim 1, wherein the X includes at least one selected from the group consisting of F and I and at least one selected from the group consisting of Br and Cl.

13. The positive electrode material according to claim 1, wherein the coating material has a thickness of 1 nm to 100 nm on the surface of the positive electrode active material, and serves to suppress electron transfer between the positive electrode active material and the first solid electrolyte.

14. The positive electrode material according to claim 1, wherein the coating material is formed in situ by reacting a lithium source, a silicon source, and a phosphorus source on the surface of the positive electrode active material during a heat treatment.

15. A battery comprising:

a positive electrode including the positive electrode material according to claim 1;

a negative electrode; and an electrolyte layer disposed between the positive electrode and the negative electrode.

16. The battery according to claim 15, wherein the electrolyte layer includes a sulfide solid electrolyte.

* * * * *